United States Patent [19]

Lessi et al.

[11] Patent Number: 5,009,512

[45] Date of Patent: Apr. 23, 1991

[54] DEVICE AND METHOD FOR MEASURING THE DEFORMATIONS OF A SAMPLE

[75] Inventors: Jacques Lessi, Maule; Philippe Perreau; Daniel Bary, both of Rueil Malmaison; Guy Grard, Argenteuil, all of France

[73] Assignee: Institute Francais du Petrole, Cedex, France

[21] Appl. No.: 521,012

[22] Filed: May 9, 1990

Related U.S. Application Data

[63] Continuation of Ser. No. 213,138, Jun. 29, 1988, abandoned.

[30] Foreign Application Priority Data

Jun. 30, 1987 [FR] France ............................ 87 09263

[51] Int. Cl.⁵ .................... G01N 25/00; G01B 7/02; G01B 21/02
[52] U.S. Cl. ............................................ 374/6; 374/55; 374/56; 33/783; 33/702; 33/560; 33/557; 33/DIG. 19
[58] Field of Search ................. 374/55, 56, 6; 33/702, 33/703, 704, 783, 560, 557, 552, 556, DIG. 19, 813, 784

[56] References Cited

U.S. PATENT DOCUMENTS

| 2,152,556 | 3/1939 | Messinger | 33/147 D |
|---|---|---|---|
| 2,662,401 | 12/1953 | Bailly | 73/38 |
| 2,689,474 | 9/1954 | Wachtel | 374/55 |
| 3,106,086 | 10/1963 | Hughel | 374/56 |
| 3,273,251 | 9/1966 | Saizon | 33/552 |
| 4,069,703 | 1/1978 | Standish et al. | 374/56 |
| 4,419,314 | 12/1983 | Bush | 264/130 |
| 4,587,739 | 5/1986 | Holcomb et al. | 33/143 L |
| 4,644,779 | 2/1987 | Sisti et al. | 73/38 |

FOREIGN PATENT DOCUMENTS

| 2423785 | 12/1979 | France | 375/55 |
|---|---|---|---|
| 306405 | 7/1971 | U.S.S.R. | 374/55 |
| 575552 | 11/1977 | U.S.S.R. | 374/55 |

OTHER PUBLICATIONS

Khan, M. R. et al., "Thermoplastic Properties of Coal at Elevated Pressures," Fuel, vol. 63 (Jan. 1984).
Amatuni, A. N. et al., "Modernized Cryostat for the VNIIM DIN-3 Interference Dilatometer," Meas. Tech. (U.S.A.), No. 12 (Dec. 1969).
Dupont 940 Thermomechanical Analyzer, Dupont Instruments, Wilmington, Del. (Apr. 1967).

Primary Examiner—William A. Cuchlinski, Jr.
Assistant Examiner—Diego F. F. Gutierrez
Attorney, Agent, or Firm—Antonelli, Terry, Stout & Kraus

[57] ABSTRACT

A device and method for measuring the deformations of a sample, which deformations particularly result from the relaxation of the stresses to which the samples was previously subjected. The device and method include the use of a cell inside which the sample is placed with the cell containing a thermal mass whose heat capacity and/or thermal conductibility are appreciably greater than those of air under normal temperature and pressure conditions.

24 Claims, 3 Drawing Sheets

DEVICE AND METHOD FOR MEASURING THE DEFORMATIONS OF A SAMPLE

This application is a continuation of application Ser. No. 213,138 filed Jun. 29, 1988, now abandoned.

BACKGROUND OF THE INVENTION

The present invention relates to an apparatus and a method for measuring, in several directions, deformations of core samples taken from geological formations, which deformations particularly being from the relaxation of the stresses which were exerted on these cores before being taken.

A method and apparatus of the aforementioned type is disclosed in commonly-assigned co-pending U.S. application Ser. No. 07/213,139, filed Jun. 29, 1988.

The present invention makes it possible to determine the tensors of stresses and/or deformations and, in particular, the direction of the minimum horizontal compression stress and, with the knowledge of this minimum horizontal compression stress, applied to mining, oil or gas production, particularly in low permeability formations, it is possible to define a plane of propagation of hydraulic fractures which are perpendicular thereto.

By determining this stress from several core samples taken at different places in a geological formation, it is possible to determine the optimum position of the well or boreholes for improving the production of a field under development.

By permeability is meant the property of the inner spaces of a rock to communicate together, which makes it possible for the fluids which they contain to move through the rock in question.

One way of knowing the condition of the stresses and/or deformations and/or more particularly this plane of propagation consists, in taking a rock core sample from the geological formation concerned, in measuring from this core sample the deformations resulting from the substantially instantaneous relaxation of the stresses in situ.

Once the sample has been taken from the formation, the formation first of all undergoes instantaneous and considerable deformations which are only accessible to measurement if this measurement is made at the bottom of the well just at the time the sample is taken.

These instantaneous deformations are succeeded, for several tens of hours, by delayed deformations whose order of size is smaller than that of the instantaneous deformations, and which may, for example, be observed once the core sample has been raised to the surface of the ground, as may be the case in oil drilling.

One method, called relaxation, consists in measuring the delayed deformations of a core sample in several directions and deriving therefrom the set of deformations and their evolution time and, consequently, to determine the stresses to which the formation considered is subjected.

If, for the sake of facility, these measurements are made on cylindrical core samples and if the axis of the core sample is considered as one of the main deformation directions (a simplifying assumption, justified when the core samples are taken from vertical wells or taken perpendicularly to the stratification), four independent directions (one parallel to the axis of the sample and three in a plane perpendicular to this axis) are sufficient for determining with a rheological model, such as those presented by Blanton and Warpinsky, the deformations of a core sample, their evolution in time and the stresses of the formation studied.

However, because particularly of the very low value of the deformations measured (a few micrometres) and because very often of the operating conditions for obtaining these latter (vibrations of the site, wind, . . . producing parasite movements), and also because of the device for acquiring these measurements, the measurements of the deformations, like the deductions made therefrom, are erroneous.

If the parasite movements of the sample adversely affect the correct measurement of the deformations of the sample, other parasite phenomena may completely mask the deformations induced by relaxation of the stresses. These phenomena are more particularly the temperature variations, even very small, of the core sample and/or of the measuring assembly, the fluid saturation variations of the sample.

SUMMARY OF THE INVENTION

Thus, to overcome the latter drawbacks, the present invention provides a device for measuring the deformations of a sample, which deformations particularly result from the relaxation of the stresses to which the sample was previously subjected. This device comprises a cell inside which the sample is placed and the cell contains a thermal mass whose heat capacity and/or thermal conductibility are appreciably greater than those of air under normal temperature and pressure conditions.

Since the sample is a solid impregnated by at least one fluid, thermal mass may be chosen so that the impregnation fluid concentration in the sample is not substantially modified.

The thermal mass may be chosen so as not to be introduced itself into the sample.

The sample may comprise an external film adapted to prevent introduction of the thermal mass into the sample.

With the sample being a solid impregnated by at least one fluid, the sample may comprise an external film adapted to prevent modification of the impregnation fluid concentration in the sample.

The thermal mass may be a liquid and be selected from the group consisting of water, paraffin oil and mercury.

The device may comprise means for regulating the temperature of the thermal mass particularly in the vicinity of the sample.

The device may comprise at least two temperature sensors, with the first temperature sensor being situated at a first distance from the sample less than the second distance from the sample where the second temperature sensor is located with a comparator means being provided for comparing the temperatures indicated by the two temperature sensors.

The device may comprise means for regulating the temperature of the thermal mass particularly in the vicinity of the sample and the comparator means may be adapted for controlling the regulation means.

With the sensors mounted on the support, the supports may be disposed outside the cell.

The present invention further provides a method for measuring the deformations of a sample using the device comprising at least two temperature sensors, the first of the two temperature sensors being situated at a first distance from the sample less than a second distance from the sample where the second temperature sensor is located.

According to this method, a thermal gradient existing in the thermal mass is determined using the values of the temperatures taken by the sensors.

The temperature distribution in the sample may be evaluated from the thermal gradient and its evolution in time.

Means may regulate, as a function of the thermal gradient, the temperature of the thermal mass particularly in the vicinity of the sample.

The period of time during which the temperatures distribution in the sample is substantially uniform may be determined.

The device or the method may be used for determining the deformations of a geological sample, such as a core sample taken from a borehole in the ground.

The above and other objects, features, and advantages of the present invention will become more apparent from the following description when taken in connection with the accompanying drawings which show, for the purposes of illustration only, several embodiments in accordance with the present invention.

DESCRIPTION OF THE PREFERRED EMBODIMENTS

Figure 1:
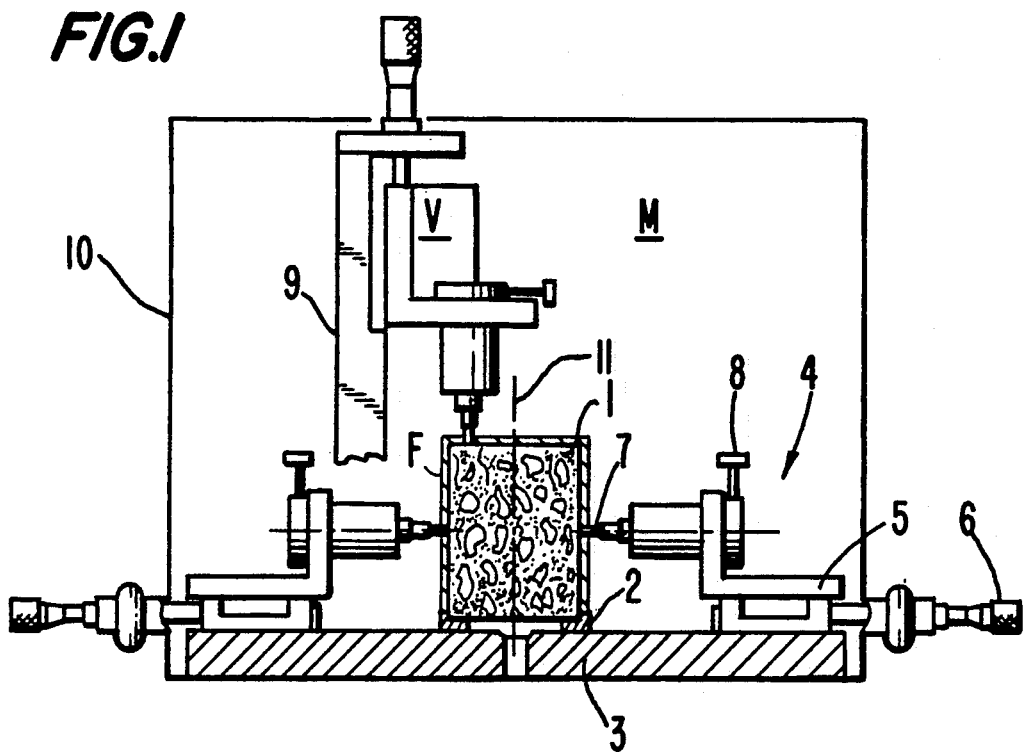
FIG. 1 is a partially schematic cross-sectional view of a measuring device of the present invention.

Referring now to the drawings wherein like reference numerals are used throughout the various views to designate like parts and, more particularly, to FIG. 1, according to this figure, a sample 1, such as a geological core sample, whose deformations due to relaxation of the stresses are to be measured and is held by centering means 2 on a table 3, so that the sample 1 has at least possible movement with respect to displacement sensor supports generally designated by the reference numeral 4 or displacement sensors 7.

In fact, particularly in mining worksites, the conditions for carrying out such measurements are relatively severe and although the sample 1 is held substantially fixed, there still remains the possibility of parasitic micro-movements of the sample 1 which must be reduced.

The displacement sensor 7 is fixed to displacement sensor support 4 which may be moved with respect to table 3 by an approach or coarse adjustment screw 8 and a micrometric screw 6.

In the embodiment to which the present description relates, the sample 1 is a mining core sample and has a cylindrical form of revolution with an axis 11 of cylindrical form corresponding to a main deformation direction 11 known in the art of the mechanics of solids.

Axis 11 of sample 1 is placed perpendicularly to the plane of table 3. The device comprises six horizontal displacement sensors 7, designated P, $P_1$, Q, $Q_1$, R, $R_1$ in FIG. 2, with each displacement sensor having a measurement direction converging with the axis 11 and perpendicular to axis 11 of sample 1. The device further comprises a vertical displacement sensor V mounted on a bracket 9 along a measurement axis parallel to the axis 11 of sample 1.

The six plus one displacement sensors 7 may be induction sensors operating with a current of 5 KHz and may have a resolution of 0.01 micrometer.

The six horizontal sensors 7 are associated in pairs (P, $P_1$), (Q, $Q_1$), (R, $R_1$), so that the directions of the sensors 7 are included substantially in an axial plane of the sample and are diametrically opposite to each other with respect to the sample 1. The three pairs of directions thus formed with the axis 11 of the sample 1, define three axial measurement planes. These axial planes are disposed with respect to each other spaced apart by an angle substantially equal to 120°. The axes of the six horizontal sensors 7 are situated in the same plane perpendicular to the axis of the sample 1.

By forming pairs of measurement directions, it is very easy to detect and evaluate the slight accidental movements with respect to table 3.

With such an arrangement of the measurement directions of the horizontal sensors 7, or axis of the sensors, each pair of directions is coaxial to an analysis axis along which the deformations of the sample 1 are easy to be obtained with accuracy, from the algebraic sum of the displacement values measured along each of the pairs of directions.

Thus, knowing the deformations of the sample 1 along three analysis axes, and using a rheological model, such as those presented by Blanton and Warpinsky, it is possible to know the tensor of the deformations of the sample 1, to follow their evolution in time and, consequently, to determine the tensor of the initial stresses of the sample 1, or else the state of the stresses of the geological formation from which the sample comes.

Although the preferred embodiment described comprises six horizontal sensors 7, the number of such sensors 7 may be reduced to five. In fact, knowing it is necessary to have five independent measurements for calculating the five unknowns (three unknowns relative to the deformations of the sample, two unknowns relative to the displacements of the sample with respect to the sensor), it is possible to use only five sensors 7 having independent measurement directions.

By measurement directions independent of each other is meant the measurements made in these directions which make it possible to make the above-mentioned calculation. One set of such directions is given more particularly by directions convergent to the axis of the sample 1 and which are not substantially included in the same half-plane delimited by the axis of the sample 1 and defined by this axis and the point of contact of the sensor 7 with the sample 1.

In order to calculate more easily the horizontal movement unknowns, at least two pairs of independent measurement directions may be formed so as to readily know the deformations along the analysis axis parallel to these pairs of directions and included in the plane of these pairs of directions.

The sample 1 may have another form than the preferred cylindrical form of revolution. Thus, the axis of the sample 1 will be defined as being a main deformation axis.

Preferably, the horizontal measurement directions are situated in the same plane perpendicular to the main deformation axis of the sample 1, but these directions may be very well placed in different planes perpendicular to said axis.

The deformation measurement device further comprises a cell 10 external to the sensors 7 and to the sample 1. This cell 10 is filled with a thermal mass generally designated by the reference character M for reducing the temperature variations of the sample and/or of mounting, and/or for limiting the fluid saturation variations of a sample impregnated with fluid.

It is known to carry out the measurements of the deformations resulting from relaxation of the stresses in air. For that, the measurement device is placed, for example, in an oven whose temperature is regulated to 25° C.±0.1° C. In this case, the choice of the regulation temperature which is situated above the ambient temperature is established so that the thermal losses of the device are always positive during the measurement time and this at any season of the year. This type of means for regulating the temperature does not necessarily comprise a cold source.

However, for example, when the sample 1 is a geological core sample, the surface of the sample 1 like its mass is very often not at the temperature of the device when it is to be placed in the device. The result then is a certain delay for the sample 1 to reach the temperature of the measurement device and beyond which the measurements are valid.

When, for example, the thermal mass M is air regulated to 25° C. and when the sample 1 is at a temperature of 10° or 15° C., it is indispensable to wait for several hours, even several tens of hours, before being able to validate the measurements.

However, the knowledge of the evolution in time of the deformations, as soon as possible after taking the sample 1, or from the beginning of relaxation of the stresses, makes it possible to improve the quality of the interpretations of the measurements.

Thus, by replacing the thermal air mass by a thermal mass of sufficient volume having more particularly a heat capacity and/or thermal conductibility greater than that of air under normal temperature and pressure conditions, it is possible to reduce the warm up time of the sample 1 and thus to improve the quality of the measurements and their interpretation.

Tests using a device placed in an oven and a liquid thermal mass formed of vaseline oil, have shown that it was necessary to wait only for 160 minutes, after immersion of the sample 1, initially at a temperature close to 10° C., for the sample to reach the temperature of the bath formed by the thermal mass.

This time is estimated by continuously observing the temperature of the bath which shows a cooling (corresponding to warming up of the sample 1) before balance is reached and, only once balance is reached, a heating of the bath produced by the single hot source of the regulation means.

Once the sample 1 is at the temperature of the bath, i.e. once its temperature is uniform, it is possible to make thermal deformation corrections by knowing the thermal expansion coefficient. The value of this coefficient may be obtained by varying the temperature of the sample 1 once relaxed and measuring the deformations then produced solely by the temperature. If not, during measurements of the deformations due to relaxation, the deformations due to expansion would mask the deformations resulting from relaxation.

This thermal mass M with improved thermal inertia, which may be formed of water, oil, mercury, a gel, a powder . . . , further makes it possible to stabilize the temperature of the device which, although made from a material with a low expansion coefficient such as INVAR (a registered trade mark for an alloy containing 64% iron, 36% nickel and having an expansion coefficient of $0.5.10^{-6°}$ $C.^{-1}$), is likely to introduce parasite thermal deformations.

The thermal mass M used may be selected, not only for its thermal qualities, but also for its capacity not to dry out or impregnate the sample measured. In fact, when the sample is solid, has certain porosity and is impregnated by a fluid, such as that of the geological formation from which the sample 1 comes, the fluid concentration variations of the sample 1, like the penetration by another fluid, causes modifications of the internal stresses, particularly during relaxation. The modifications of the internal stresses result in modifications of the measured deformations and so an alteration of the deformation measurements.

Thus, by using a thermal mass M which neither dries out nor impregnates the sample 1, the deformations relative to these effects are cancelled out and no correction due to the fluid concentration variation of the sample is required.

If the thermal mass risks drying and/or impregnating a sample 1 previously impregnated with fluid, the sample 1 may comprise an external waterproofing film, adapted so as to prevent the modification of the impregnation fluid concentration and/or introduction of the thermal mass in the sample 1.

When the sample 1 is a water impregnated geological core sample and when the thermal mass comprises water, the sample 1 may comprise a film adapted for preventing the possible migration of a salt present in the sample 1.

Another way of determining the validity of the measurements of deformation of a sample 1 consists in using two temperature sensors $S_1$, $S_2$, with a first temperature sensor $S_1$ being situated at a first distance from the sample 1 less than a second distance from the sample 1 where the second temperature sensor $S_2$ is located.

For example, the first sensor $S_1$ may be placed on the sample 1 and the second sensor $S_2$ at 1 or 2 cm from the sample 1 in the thermal mass M. With this arrangement of the sensors $S_1$, $S_2$ and using the temperature values taken by the temperature sensors $S_1$, $S_2$, a thermal gradient existing in the thermal mass M may then be determined, for example, by using a comparator means C (FIG. 4) and, consequently, the moment when the thermal balance is reached and when the deformation measurements are valid (from this moment the temperature of the sample 1 is known).

During the deformation measurements, slight reference temperature variations of the cell, which introduce disturbances into the deformation measurements, may then be corrected if relationships are established between deformations and temperature by calibrating the mounting and sample assembly. This calibration may be obtained by imposing a temperature variation at the end of the test, when the deformations resulting from the relaxation of the stresses have become negligible.

To better evaluate the temperature distribution in the sample 1, movements of the thermal mass may be avoided.

Figure 4:
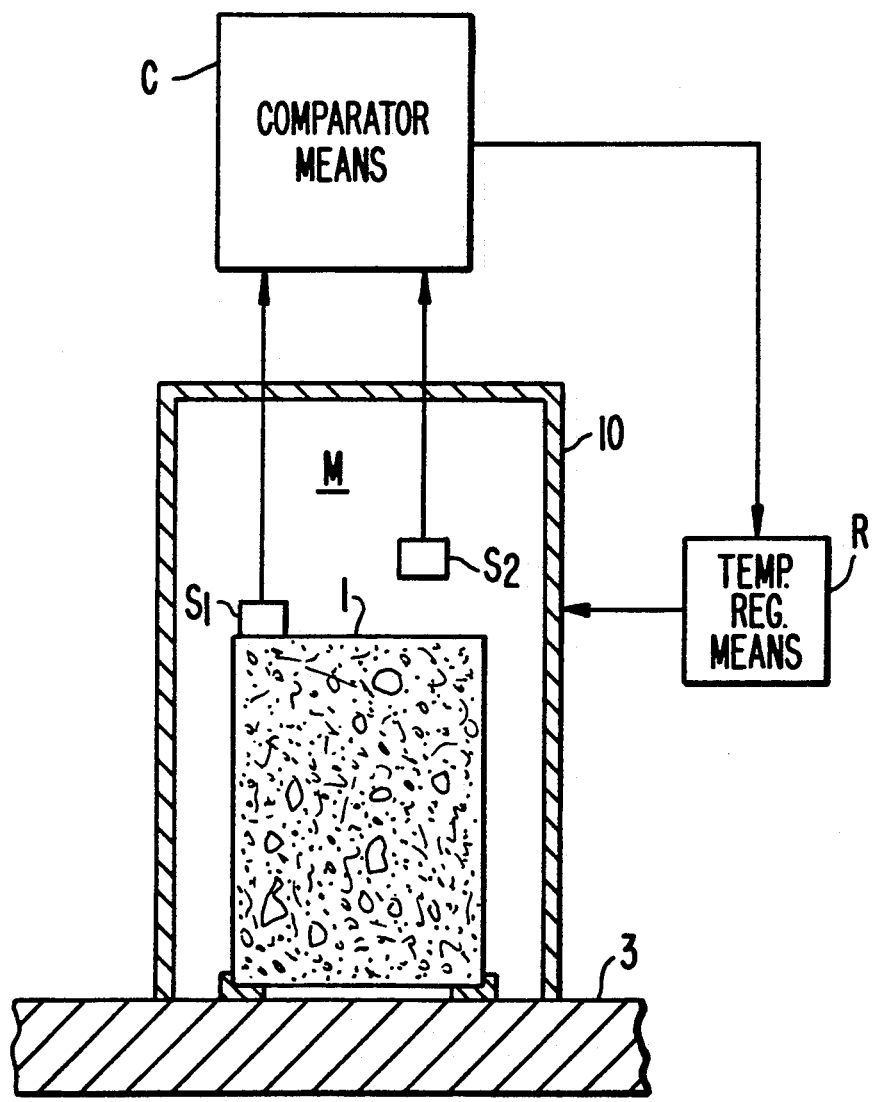
FIG. 4 is a schematic view of an arrangement for determining a validity of measurements of deformation of a sample. Another embodiment of the measuring device of the present invention.

As a function of this thermal gradient as shown in FIG. 4 means "R" may be controlled by a comparator means C for regulating the temperature of the thermal mass, such as a cold source and/or a hot source, such regulation being effective particularly in the vicinity of the sample 1.

Figure 3:
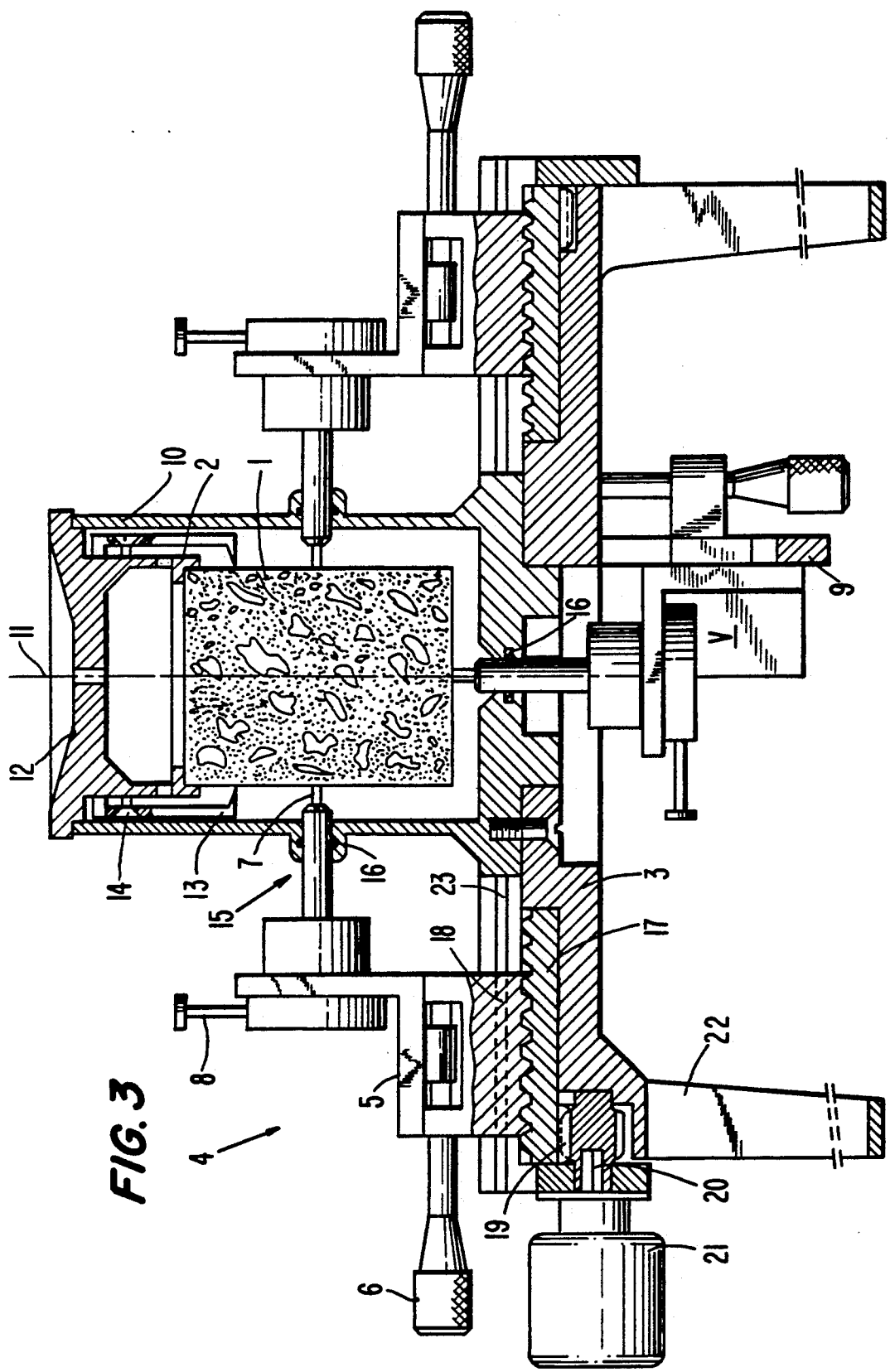
FIG. 3 is a partially schematic cross-sectional view of another embodiment of the measuring device of the present invention.

In FIG. 3, the supports 4 of the horizontal displacement sensors 7, the course adjustment screw 8 and micrometric 6 screw are disposed outside cell 10. The sample 1 is centred in cell 10 by centering means 2 fixed to a lid 12 of the cell. The sample 1 is held on lid 12 by claws 13 tightened by screws 14.

The horizontal sensors 7 penetrate through the cylindrical wall of the cell through circular orifices 15 whose edges are provided with sealing means 16 cooperating with the six sensor 7 for preventing leakage of the fluid from the cell 10.

The six-supports 4 of the horizontal sensors 7 are mounted in slides 23 on the table 3 and are synchronized for translational movement by providing rapid and equal approach of the sensors 7 so that they reach their measurement position substantially simultaneously, and thus reduce the time for adjusting the position of the sensors 7 once the sample 1 is placed in cell 10, since the diameter of the samples possibly varying considerably from each other.

These synchronous means for translatory advance of sensors 7 comprise, for example, a crown wheel 17, rotating about axis 11. This crown 17 has on its upper face a spiral which cooperates with a locally complementary form 18 secured to each of supports 4 or sensor 7 so as to provide a movement of the supports 4, and on its lower face, peripheral teeth 19 which cooperate with a pinion 20 driven by an electric motor 21 for causing rotation of the ring in one direction or in the opposite direction and thus forward or backward movement of sensor 7.

Figure 2:
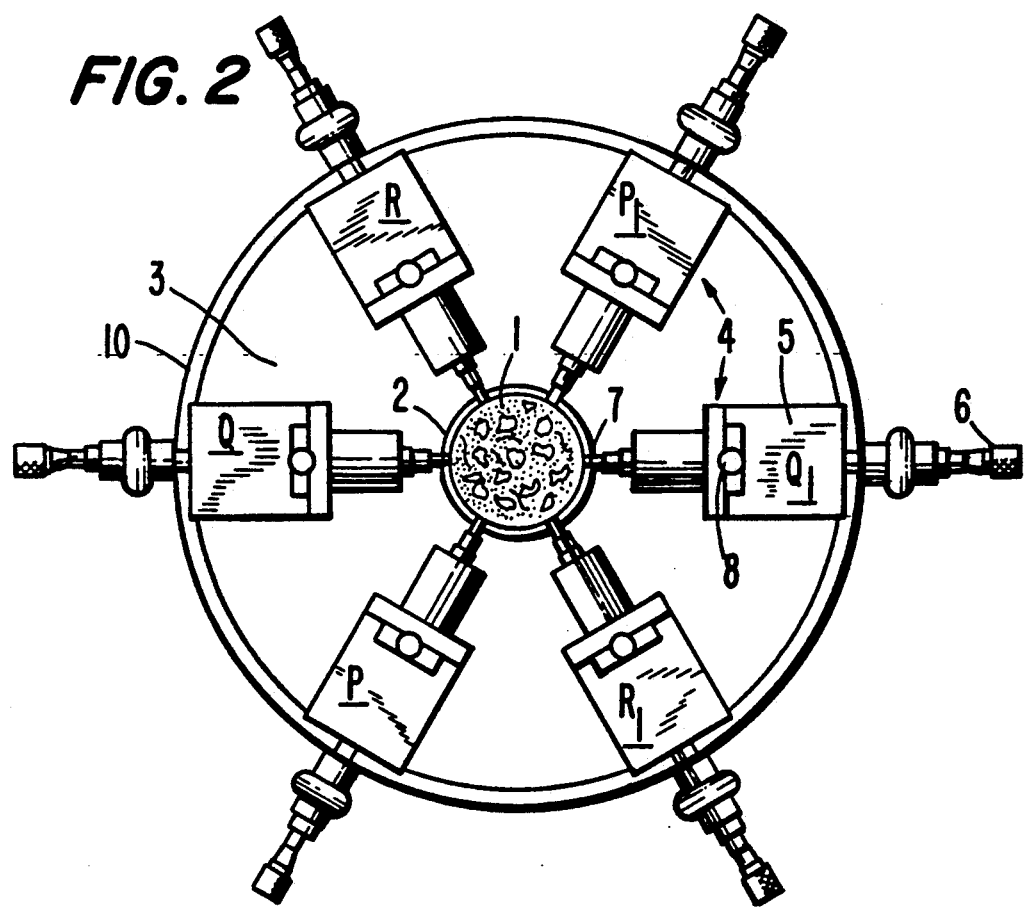
FIG. 2 is a top view of the measuring device of FIG. 1.

In contradistinction to the device shown in FIGS. 1 and 2, the vertical displacement sensor V, bracket 9 and the associated approach screw 8 are disposed below the table 3 so that the touch of the vertical sensor V bears on the lower face of the sample one is substantially in the axis thereof.

Sealing means 16 prevent the fluid forming the thermal mass from escaping through the annular space separating table 3 from the vertical sensor V.

The device further comprises feet 22 for seating it on a measurement space.

The embodiment in FIG. 3 is particularly well adapted to the use of mercury as thermal mass. Since the thermal conductibility of mercury is relatively very high, for example, with respect to that of water or oil, the time required for warming up the sample is consequently reduced. Adapted heating means make it possible to obtain a rapid balance of the temperatures of the sample 1. Mercury also offers the advantage of not drying or impregnating a good number of rock samples and thus does not require waterproofing thereof, which makes possible a substantially non delayed measurement.

Furthermore, the arrangement of the sensors 7 and of the cell 10 makes it possible to rapidly position the sample 1 and sensors 7 and thus rapidly obtain the measurements. Furthermore, the fluid forming the thermal mass may remain in the cell 10 between the measurements of several consecutive samples which avoids handling and increases the safety in positioning particularly when using fluids such as mercury which requires special precautions.

What is claimed is:

1. A device for measuring deformations of a sample, said deformations particularly resulting from relaxation of stresses to which the sample was previously subjected, the device comprising a cell inside which the sample is placed, said cell contains a fluid thermal mass whose heat capacity and thermal conductibility are appreciably greater than those of air under normal temperature and pressure conditions, and sensor means cooperable with said sample for sensing displacements of the sample so as to enable a measurement of deformations thereof, wherein the sample is a solid impregnated by at least one fluid, the fluid thermal mass is chosen so that said impregnation fluid concentration in the sample is not substantially modified during measurement of the deformations and wherein said fluid thermal mass is chosen so as not to be introduced into the sample.

2. The device as claimed in claim 1, wherein the sample comprises an external film adapted to prevent an introduction of the thermal mass into the sample.

3. The device as claimed in claim 1, wherein said sample comprises an external film adapted to prevent a modification of the impregnation fluid concentration in the sample.

4. The device as claimed in claim 1, wherein the thermal mass is a liquid.

5. The device as claimed in claim 1, wherein the thermal mass is a liquid chosen from the group consisting of water, paraffin oil and mercury.

6. The device as claimed in claim 1, further comprising means for regulating a temperature of the thermal mass particularly in a vicinity of the sample.

7. The device as claimed of claim 1, further comprising at least two temperature sensors, a first of the two temperature sensors being situated at a first distance from the sample less than a second distance from the sample where the second temperature sensor is located, and comparator means for comparing the temperature indicated by the two temperature sensors.

8. The device as claimed in claim 7, further comprising regulating means for regulating a temperature of the thermal mass, particularly in a vicinity of the sample, and wherein said regulating means are controlled in response to an output from said comparator means.

9. The device as claimed in claim 1, wherein said sensor means are mounted on supports disposed outside of said cell means.

10. The device as claimed in claim 1, wherein the sample is a geological sample.

11. A method of measuring deformations of a sample, said deformations particularly resulting from relaxation of stresses to which the sample was previously subjected, said sample being a solid impregnated by at least one fluid the method comprising the steps of:
providing a cell means for accommodating the sample;
disposing a fluid thermal mass having at least one of a heat capacity and a thermal conductibility appreciably greater than air under normal temperature and pressure conditions in said cell means surrounding said sample, said fluid thermal mass being such that the impregnation fluid concentration in the sample is not substantially modified during measurements, and wherein said fluid thermal mass is chosen so as not to be introduced into the sample;
measuring of the deformations of the sample;
providing at least two temperature sensors;
disposing a first of the two temperature sensors at a first distance from the sample;
disposing a second of the two temperature sensors at a second distance greater than said first distance;

and determining a thermal gradient existing in the thermal mass by values of the temperature sensed by the at least two temperature sensors.

12. The method as claimed in claim 11, further comprising the steps of evaluating temperature distribution in the sample from the thermal gradient and its evolution over a period of time.

13. The method as claimed in claim 12, further comprising the step of regulating the temperature of the thermal mass particularly in the vicinity of the sample as a function of the thermal gradient.

14. The method as claimed in claim 13, wherein the period of time is determined during which a temperature distribution in the sample becomes substantially uniform.

15. The method as claimed in claim 11, wherein the sample is a geological sample.

16. A device for measuring deformations of a sample, said deformations particularly resulting from relaxation of stress as to which the sample was previously subjected, the device comprising a cell inside which the sample is placed, said cell contains a fluid thermal mass having a heat capacity and thermal conductibility which are appreciably greater than those of air under normal temperature and pressure conditions, said fluid thermal mass is chosen so as not to be introduced into the sample, and wherein means cooperable with the sample are provided for sensing displacements of the sample so as to enable a measurement of deformation thereof.

17. The device as claimed in claim 16, wherein the sample comprises an external film for preventing an introduction of the thermal mass into the sample.

18. The device as claimed in one of claims 16 or 17, wherein the sample is a solid impregnated by at least one fluid, and wherein said sample comprises an external film for preventing a modification of an impregnation fluid concentration in the sample.

19. The device as claimed in one of claims 16 or 17, wherein the thermal mass is a liquid.

20. The device as claimed in one of claims 16 or 17, wherein the thermal mass is a liquid chosen from the group consisting of water, paraffin oil and mercury.

21. The device as claimed in one of claims 16 or 17, further comprising means for regulating a temperature of the thermal mass particularly in a vicinity of the sample.

22. The device as claimed in one of claims 16 or 17, further comprising at least two temperature sensors, a first of the two temperature sensors being situated at a first distance from the sample less than a second distance from the sample where the second temperature sensor is located, and comparator means for comparing the temperatures indicated by the two temperature sensors.

23. The device as claimed in claim 22, further comprising regulating means for regulating a temperature of the thermal mass, particularly in a vicinity of the sample, and wherein said regulating means are controlled in response to an output from said comparator means.

24. The device as claimed in one of claims 16 or 17, wherein said means for sensing displacements of the sample are mounted on supports disposed outside of said cell.

* * * * *